US008429710B1

(12) United States Patent
Schepis et al.

(10) Patent No.: US 8,429,710 B1
(45) Date of Patent: Apr. 23, 2013

(54) PREVENTING EXPOSURE OF PRIVATE INFORMATION

(75) Inventors: Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 1228 days.

(21) Appl. No.: 12/124,071

(22) Filed: May 20, 2008

(51) Int. Cl.
*G06F 17/00* (2006.01)
(52) U.S. Cl.
USPC ............... 726/1; 726/22; 726/26; 707/705; 707/706; 707/707; 707/708; 707/709; 707/710; 709/225
(58) Field of Classification Search ............... 726/1, 22, 726/26; 707/705–710; 709/225
See application file for complete search history.

(56) References Cited

U.S. PATENT DOCUMENTS

| | | | | |
|---|---|---|---|---|
| 7,822,620 | B2 * | 10/2010 | Dixon et al. | 705/1.1 |
| 2005/0216300 | A1 * | 9/2005 | Appelman et al. | 705/1 |
| 2007/0180510 | A1 * | 8/2007 | Long et al. | 726/10 |
| 2008/0034424 | A1 * | 2/2008 | Overcash et al. | 726/22 |

OTHER PUBLICATIONS

Understanding identity exposure in pervasive computing environments Feng Zhu, Sandra Carpenter, Ajinkya Kulkarni. Pervasive and Mobile Computing Oct. 2012. vol. 8,Iss.5;Source: ACM Digital Library Core Package.*
Security in migratory interactive web applications Giuseppe Ghiani, Fabio Paternò, Lorenzo Isoni. MUM '12: Proceedings of the 11th International Conference on Mobile and Ubiquitous Multimedia Dec. 2012;Source: ACM Digital Library Core Package.*
Media Monitoring Using Social Networks White, T.; Chu, W.; Salehi-Abari, A. Social Computing (SocialCom), 2010 IEEE Second International Conference on (978-1-4244-8439-3) 2010. p. 661-668;Source: IEEE Electronic Library Online.*
Sensitivity to online privacy in social networking sites Zamzami, I.F.; Olowolayemo, A.; Bakare, K.K.; Kindy, D.A. Information and Communication Technology for the Muslim World (ICT4M), 2010 International Conference on (978-1-4244-7920-7).*
*Data Loss Prevention Best Practices Managing Sensitive Data in the Enterprise A Report from Ironport Systems*, [Online], pp. 1-21, Retrieved from URL:< http://www.ironport.com/pdf/ironport_dlp_booklet.pdf>, 2007.
*Data Loss Prevention Products*, [Online], pp. 1-3, Retrieved from URL:< http://en.wikipedia.org/wiki/Data_Loss_Prevention>, Aug. 15, 2008.

* cited by examiner

*Primary Examiner* — Thanhnga B Truong
*Assistant Examiner* — Angela Holmes
(74) *Attorney, Agent, or Firm* — Fenwick & West LLP (57) ABSTRACT

A client communicates with private websites and/or public websites via a network. The client includes a security engine that prevents a user from unknowingly exposing private information. The security engine monitors web browsing for user submittal of information to a website. The security engine determines a category for the website and analyzes the information submitted to the website. The security engine determines if there is a risk of exposing information from the submittal and performs enforcement if it is determined that there is a risk.

14 Claims, 5 Drawing Sheets

PREVENTING EXPOSURE OF PRIVATE INFORMATION

BACKGROUND OF THE INVENTION

1. Field of Art

This invention pertains in general to computer security and in particular to protecting private information.

2. Description of the Related Art

The typical internet user generally has many different internet profiles to manage. Authentication to gain access to these internet profiles normally is achieved with a username and password. It is well known that users tend to select weak passwords to gain access to internet accounts associated with these profiles. Additionally, protecting access to the internet profiles becomes more difficult as users typically tend to use the same username and/or password for all their internet profiles, regardless of how sensitive the information is within the profiles.

For example, many internet users have accounts associated with publicly viewed websites, such as social networking websites. Publicly viewed websites typically display information to other users of the website so that users may contact one another or to associate themselves through common characteristics. For example, on a social networking website, users generally are encouraged to publicly display their electronic mail (e-mail) address for communication purposes. This results in many users unknowingly exposing part of the authentication mechanism used to protect private accounts that store sensitive private information, such as a user's bank account. Hence, users' private accounts are vulnerable to access from malicious users who are not intended to have access to sensitive private information within the private accounts.

Accordingly, there is a need for a method to prevent users from exposing private information associated with private accounts on publicly accessed web sites.

BRIEF SUMMARY

The above and other problems are addressed by a method, computer-implemented system, and computer program product that prevent users from exposing private information on a public account such as a social networking website. One embodiment of the method determines a category associated with a website to which a user is submitting information. The method determines a category associated with the information. The method further determines whether submitting the information to the website is a security risk based at least in part on the category associated with the website and the category associated with the information. The method further performs an enforcement action responsive to determining that submitting the information to the website is a security risk.

Embodiments of the computer-implemented system comprise a computer processor and a computer-readable storage medium storing computer program modules configured to execute on the computer processor. The computer program modules comprise a classification module configured to determine a category associated with a website to which a user is submitting information. Additionally, the computer program modules comprise an analysis module configured to determine a category associated with the information. The analysis module is further configured to determine whether submitting the information to the website is a security risk based at least in part on the category associated with the website and the category associated with the information. The computer program modules further comprise an enforcement module configured to perform an enforcement action responsive to determining that submitting the information to the website is a security risk.

Embodiments of the computer program product have a computer-readable storage medium storing computer-executable code for preventing exposure of private information on a website, the code comprising a classification module configured to determine a category associated with a website to which a user is submitting information. Additionally, the code comprises an analysis module determine a category associated with the information. The code comprising the analysis module is further configured to determine whether submitting the information to the website is a security risk based at least in part on the category associated with the website and the category associated with the information. The code further comprises an enforcement module configured to warn the user that private sensitive information may be exposed and is further configured to prevent the user from exposing the private information. In addition, the code further comprises an enforcement module configured to perform an enforcement action responsive to determining that submitting the information to the website is a security risk.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
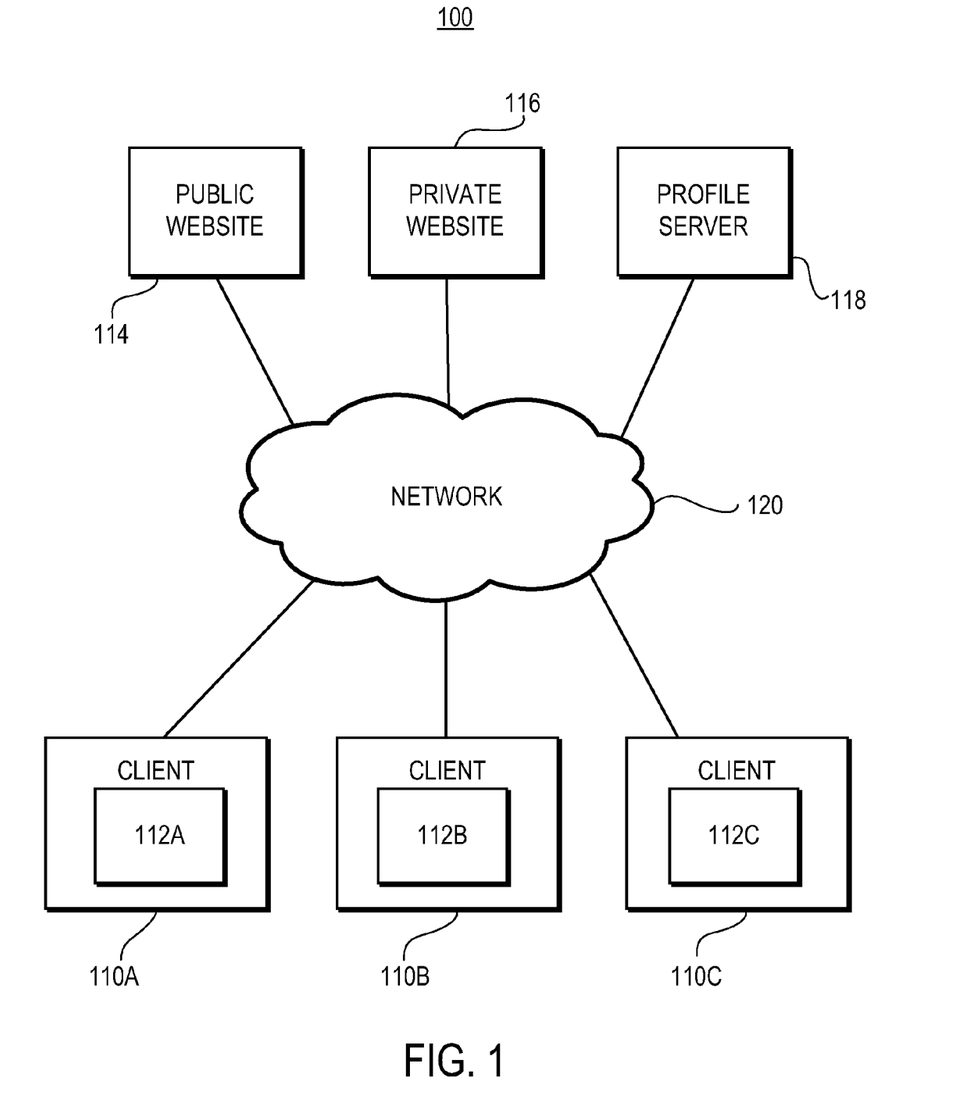
FIG. 1 is a high-level block diagram of a computing environment according to one embodiment.

FIG. 1 is a high-level block diagram of a computing environment 100 according to one embodiment. FIG. 1 illustrates three clients 110 connected to a public website 114, a private website 116 and a profile server 118 by a network 120. Only three clients 112, one public website 114 and one private website 116 are shown in FIG. 1 in order to simplify and clarify the description. Embodiments of the computing environment 100 can have thousands or millions of clients 112, public websites 114 and/or private websites 116 connected to the network 120.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g., "112" in the text refers to reference numerals "112A," "112B," and/or "112C" in the figures).

Generally, a website includes a collection of one or more web pages stored on a web server. A website is identified by its uniform resource locator (URL). Many websites can be categorized based on the types of content provided by the sites as either public 114 or private 116 websites. A public website 114 is a website in which information associated with the user is publicly displayed to other users on the public website 114. The publicly displayed information may include the user's hobbies, birth date, relationship status, sign of the zodiac, favorite music, e-mail address, instant message name, etc. An example of a public website 114 is a social networking website that encourages its users to publish personal information in their user profile. Additionally, internet forums or blogs may be considered public 114 websites as users of these websites are allowed to view profiles of other users which contain information about the user associated with the profile. Furthermore, users are able to post messages that are publicly viewed by other users of the website.

A private website 116 is a website containing private information that should not be publicly exposed. Private websites 116 typically contain information that the user would not want any other person to view. Examples of private websites 116 are websites of banks and other financial institutions, websites of online stores containing credit card information of the user, etc. Typically, users provide private information to private websites 116. Private information may contain information such as a username and password to the user's bank account information on a private website 116, home address or social security number.

The profile server 118 interacts with the clients 110 via the network 120. In one embodiment, the profile server 118 includes a categorized sites list describing category classifications of known websites. That is, the profile server 118 describes whether certain websites are categorized as public or private, where the category information is provided by a provider of the security engine 112 and/or by the users of clients 110.

In one embodiment, a client 110 is a computer used by one or more users to perform activities including browsing websites via the network 120. The client 110, for example, can be a personal computer executing a web browser such as MICROSOFT INTERNET EXPLORER that allows the user to retrieve and display content from websites via the network 120. In other embodiments, the client 110 is a network-capable device other than a computer, such as a personal digital assistant (PDA), a mobile telephone, a pager, a television "set-top box," etc. Further, in some embodiments the client 110 is a gateway server, firewall or other device that monitors the web browsing performed by one or more other clients. These latter types of devices are referred to herein as "clients" for purposes of simplicity and clarity, even if they do not fit the conventional definition of a "client."

In one embodiment, the client 110 executes a security engine 112 that prevents a user from unknowingly exposing private information on a website. Users sometimes expose private information by submitting private information to public websites 114. Generally, users tend to mingle private information on public websites 114. Exposing private information on a public website 114 is dangerous because malicious users can use the exposed information to gain access to accounts on private websites 116. An embodiment of the security engine 112 monitors user actions involved in browsing websites and tracks the information that the user provides to various websites. In one embodiment, the security engine 112 uses the category information from the profile server 118 to categorize websites as public or private. If the security engine 112 detects that the user is attempting to submit private information to a public website 116 or use public information on a private website, the security engine 112 may warn the user that submitting the information may result in a security risk. Generally, a security risk is an unwanted exposure of information.

The network 120 represents the communication pathways between the clients 110, profile server 118, public websites 114 and private websites 116. In one embodiment, the network 120 is the Internet. The network 120 can also utilize dedicated or private communication links that are not necessarily part of the Internet. In one embodiment, the network 120 uses standard communications technologies and/or protocols. Thus, the network 120 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
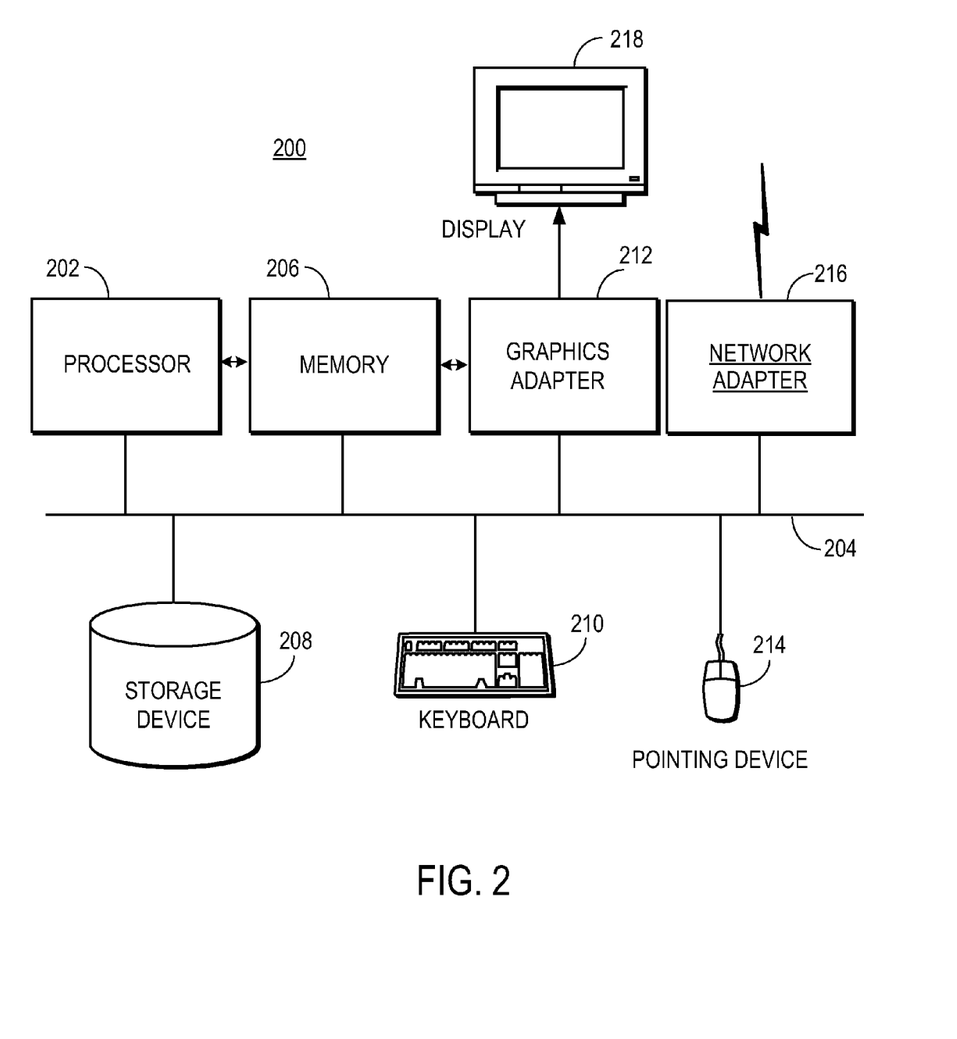
FIG. 2 is a high-level block diagram illustrating a typical computer for use as a profile server, client, and or/web server providing a website.

FIG. 2 is a high-level block diagram illustrating a typical computer 200 for use as a profile server 118, client 110, and/or web server providing a public website 114 or a private website 116. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 120.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 110 that is a mobile telephone typically has limited processing power, a small display 218, and might lack a pointing device 214. The profile server 118, in contrast, may comprise multiple blade servers working together to provide the functionality described herein.

Figure 3:
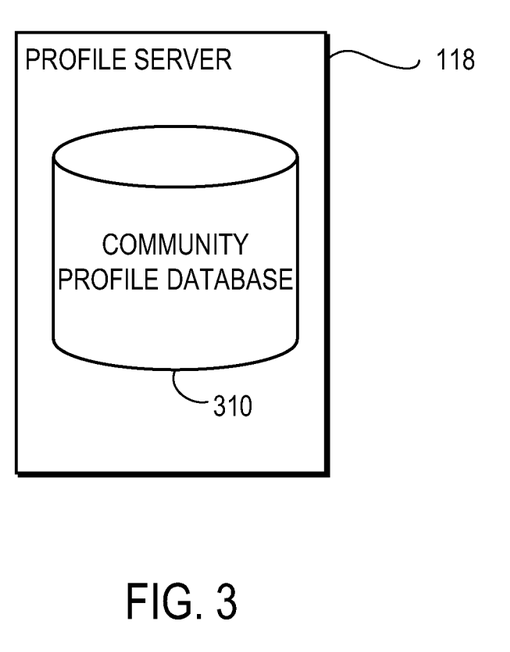
FIG. 3 is a high-level block diagram illustrating a detailed view of the profile server according to one embodiment.

FIG. 3 is a high-level block diagram illustrating a detailed view of the profile server 118 according to one embodiment. In one embodiment, the profile server 118 comprises a community profile database 310. The community profile database 310 describes categories of websites and the privacy levels of websites accessed by users. In one embodiment, the maintainer of the profile server 118 identifies common or popular websites and stores category information regarding the browsed websites in the community profile database 310. In another embodiment, the profile server 118 receives website categorizations from clients 110 as websites are categorized by users. The website categorizations are used to build lists of categorized websites which may be used by the security engine 112 to categorize a website. In one embodiment, the community profile database 310 stores a private website list identifying websites that have been categorized as private. Additionally, the community profile database 310 stores a public website list identifying websites that have been categorized as public.

In an alternative embodiment, the community profile database 410 stores information sent to websites by each individual client 110. As users send information to websites, the information is also received by the profile server 118 and stored in the community profile database 410. This allows users of the security engine 112A, 112B and/or 112C remote access to their submitted information from the community profile database 310 even if they are not using their respective client 110.

Figure 4:
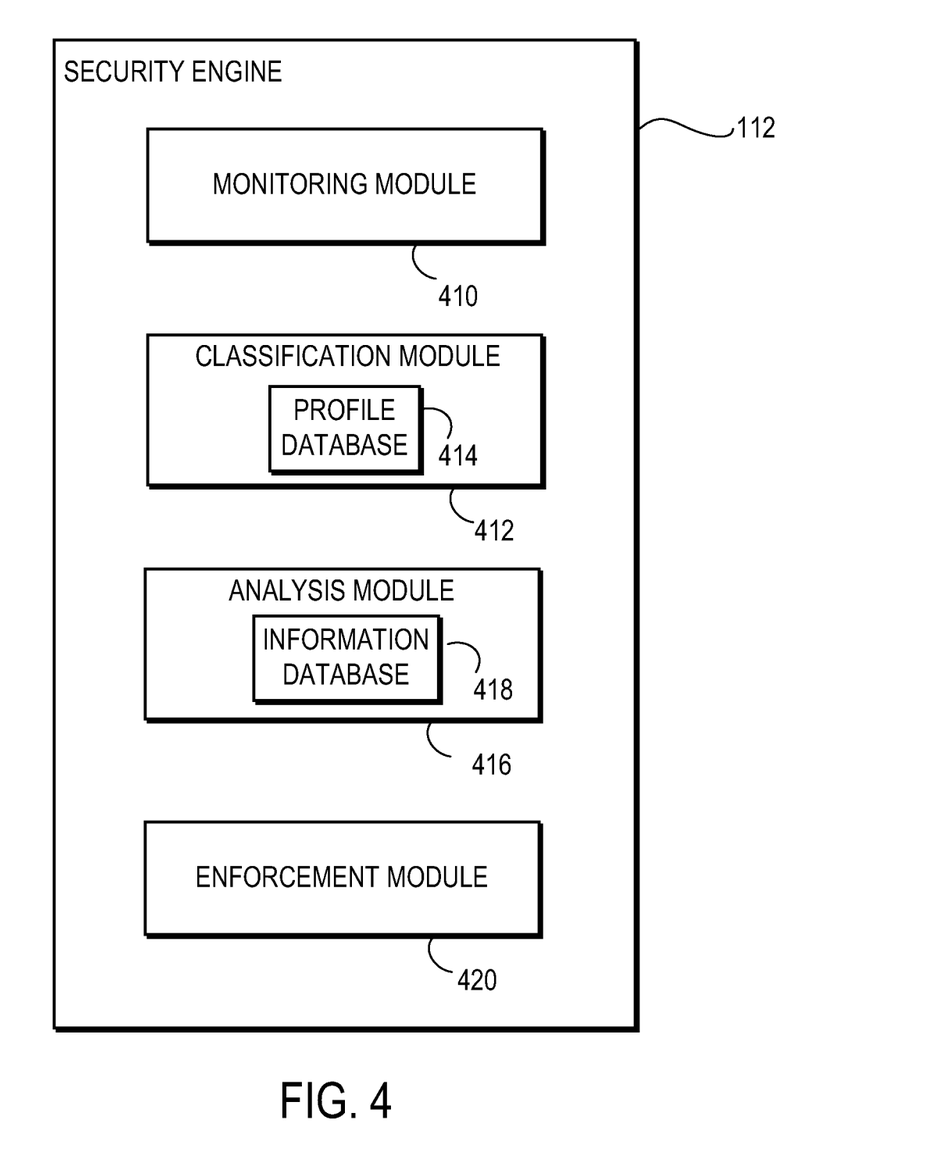
FIG. 4 is a high-level block diagram illustrating a detailed view of the security engine of a client according to one embodiment.

FIG. 4 is a high-level block diagram illustrating a detailed view of the security engine 112 of a client 110 according to one embodiment. In some embodiments the security engine 112 is incorporated into an operating system executing on the client 110 while in other embodiments the security engine 112 is a standalone application or part of another product. As shown in FIG. 4, the security engine 112 includes multiple modules. Those of skill in the art will recognize that other embodiments of the security engine 112 can have different and/or other modules than the ones described here, and that the functionalities can be distributed amount the modules in a different manner.

A monitoring module 410 monitors user web browsing at the client 110. In one embodiment, the monitoring module 410 monitors user submissions, and attempted submissions, of information to websites. For ease of discussion, user "submission" of information will refer to both attempted user submission of information and actual submission of information. The monitored submissions can include submissions that occur as the user is registering (i.e., creating) a new account for a website and as the user is logging into an existing account. The monitoring module 410 also detects submissions of information in data entry fields during other interactions with a website. These submissions typically include usernames, passwords, and other information that might present a security risk if the submitted information were publicly exposed. The monitoring module 410 receives the submitted information prior to the information being received by the website.

A classification module 412 categorizes websites to which the user has submitted information. Generally, the classification module 414 categorizes a website being browsed by a user as either a public 114 or private website 116. In one embodiment, the classification module 412 displays a prompt to the user. The prompt requests feedback from the user regarding whether the website being browsed is a private 116 or a public 114 website. In another embodiment, the classification module 412 may communicate with the profile server 118 for website classification information. The profile server 118 may have categorization information associated with the website being browsed that the classification module 412 may utilize to categorize the website. In a further embodiment, the classification module 412 searches the profile database 414, which is further described below, for a category of the website.

In one embodiment, the classification module 412 classifies websites using multiple levels of privacy, rather than merely classifying websites as public or private. A privacy level for a website is an indication of the privacy of the information maintained on, or submitted to the website. In one embodiment, the privacy levels include private, very private, and extremely private, with each privacy level indicating an increasing need to secure the information maintained by, or submitted to, the website. Note that these privacy levels are for illustrative purposes only and any appropriate indication of privacy can be used.

In one embodiment, the privacy level of a website may be automatically determined by the classification module 412 based on the content stored by the website. For example, a bank website may contain financial information regarding the user and may be considered extremely private while a website associated with the user's e-mail account may be considered very private. Alternatively, the classification module 412 may display a prompt to the user requesting the privacy level of the website. This allows the user to indicate the correct privacy level for the website.

In a further embodiment, the classification module 412 allows a user to set general options and can configure the classification module 412 to monitor specific websites. Additionally, users may edit the list of sites which have been categorized as public or private.

As previously mentioned, an embodiment of the classification module 412 includes a profile database 414. The profile database 414 stores website category information of websites to which the user has submitted information. Once a website has been categorized, the website categorization information is stored in the profile database 414. In one embodiment, the profile database 414 stores a list of known private websites and a list of known public websites that have been browsed by the user.

An analysis module 416 analyzes information that users have submitted to websites. An embodiment of the analysis module 416 includes an information database 418. The information database 418 stores information that has been submitted to websites and associates the information with the categories of the websites to which the information has been submitted. In one embodiment, information may be categorized as either private or public information. The category associated with the submitted information indicates a security value of the information. That is, the category indicates the importance of whether the information should be kept private. Generally, information is categorized based on the category of the website associated with the information. For example, information that is submitted to a private website 116, such as a bank website, may be categorized as private information. Whereas, information submitted to public website 114, such as a social networking website may be categorized as public information.

In one embodiment, the analysis module 416 analyzes information that users are submitting to websites. The analysis module 416 determines if users are attempting to mingle private and public information which poses a risk of exposing private information. In one embodiment, the analysis module 416 detects when a user submits private information to a public website 114. The analysis module 116 may also detect user submission of public information to a private website 116 because the information has already inherently been publicly exposed. Thus, the user should not re-use publicly viewed information on a private website 116. In one embodiment, the analysis module 416 receives from the classification module 412 website category information of the website to which the user is attempting to submit information. Additionally, the analysis module 416 receives from the monitoring module 410 the information that the user is attempting to submit. In one embodiment, the analysis module 416 compares the information that the user is attempting to submit to categorized information stored in the information database 418. The analysis module 416 determines if the information has been previously categorized by searching the information database 418 for categorized information that matches the information the user is submitting. If the analysis module 416 determines that the submitted information matches categorized information stored in the information database 418, the analysis module 416 compares the category of the information and the category of the website being browsed. From the comparison, the analysis module 416 determines if the user is submitting private information to a public website 114 or whether the user is submitting public information to a private website 116. If the analysis module determines that the user is attempting to mingle private information on public websites 114 or public information on private websites 116, the enforcement module 420, which is further described below, is called to perform enforcement actions to prevent a potential security risk.

In a further embodiment, if the submitted information was not previously categorized, the analysis module 416 associates the submitted information with the category of the website being browsed. That is, the analysis module 418 categorizes the submitted information as the same category as the website being browsed. For example, if a user is registering a financial account on a banking website that has been determined a private website 116, the user may provide an answer to a secret question to gain access to the account. If the answer to the secret question is not located within the information database 418, the secret question is categorized as private information. In an embodiment, the submitted information and its associated category are stored in the information database 418. In a further embodiment, the user may be prompted to categorize the information as private or public information.

Note that the embodiments discussed above in reference to the analysis module 416 may be extended to embodiments where there are more than two levels of privacy. For example, the analysis module 416 can determine whether a user may is potentially exposing highly private information on a less private website.

The enforcement module 420 performs an enforcement action in response to determining that user submission of information would create a security risk. The enforcement module 420 may display a warning message to the user. The warning message may indicate to the user that the attempted submission publicly exposes private information and or uses public information in association with a private website 116. Further, the warning message may display to the user a recommendation to mitigate the security risk by, for example, using an alternate username and/or password. In one embodiment, the enforcement module 420 blocks the submission of information that is creating the security risk.

Figure 5:
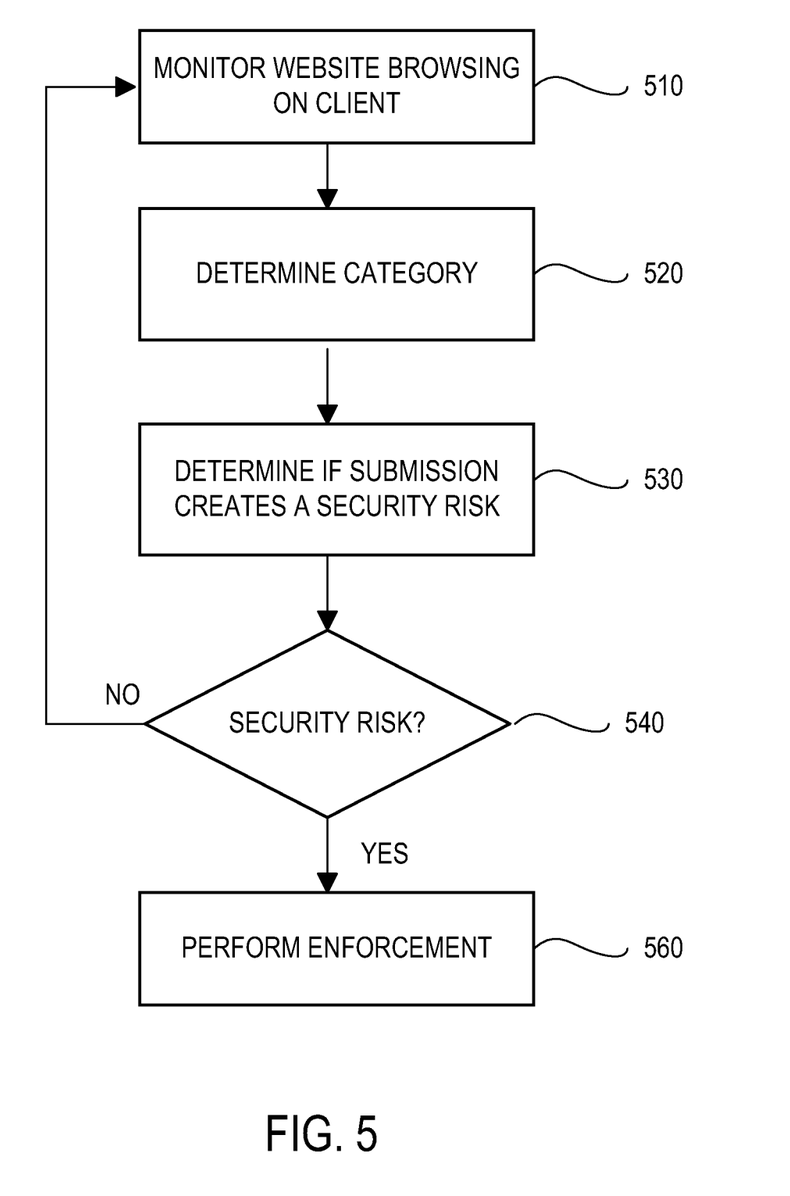
FIG. 5 is a flowchart illustrating steps performed by the security engine to prevent exposure of private information on publicly viewed websites.

FIG. 5 is a flowchart illustrating steps performed by the security engine 112 to prevent exposure of private information. Other embodiments perform the illustrated steps in different orders, and/or perform different or additional steps. Moreover, some or all of the steps can be performed by entities other than the security engine 112.

The security engine 112 monitors 510 website browsing on a client 110. In one embodiment, the security engine 112 monitors user submission of information to websites. For example, the user may be creating a new account on a website and the security engine 112 may detect attempted submission of information to the website. The security engine 112 categorizes 520 the website as either a public or private. In one embodiment, the security engine 112 may refer to the profile server 118 or to locally stored information for the website categorization. The security engine 112 then determines 530 whether the submission of information creates a security risk. In one embodiment, a security risk is present if the information submitted by the user is categorized as private information and the website that will receive the information is a public website 114. The submission of public information on a private website 116 may also be a security risk. In one embodiment, to determine 540 that a security risk is present, the security engine 112 compares the submitted information to stored categorized information. If the security engine 112 locates categorized information that matches the submitted information, the category of the website being browsed is compared to the category of the submitted information to determine if a risk is present.

If the security engine 112 determines 540 that a security risk is present, the security engine 112 performs 560 enforcement. In one embodiment, the security engine 112 may provide a prompt to the user indicating that the submission may expose private information on the public website 114 or that the user is submitting public information to a private website 116. The security engine 112 may also block the submission. If the security engine 112 determines 530 that private information will not been exposed 540, the security engine 112 continues to monitor 510 website browsing on client 110 for additional submissions.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for preventing a user from exposing private information on a website, the method comprising:
  receiving information from a user for submission to a website;
  determining a category associated with the website to which the user is submitting the information, the category associated with the website indicating whether the website publicly exposes information submitted to the website or whether the website includes private information that should not be publically exposed;
  determining a category associated with the information indicating whether the information should not be publically exposed or whether the information has already been publically exposed;
  comparing the category associated with the website and the category associated with the information;
  determining that submitting the information to the website is a security risk based on the comparison indicating that the category associated with the website indicates that the website publicly exposes information submitted to the website and that the category associated with the information indicates that the information should not be publically exposed; and performing an enforcement action responsive to determining that submitting the information to the website is a security risk.

2. The computer-implemented method of claim 1, the method further comprising determining that the user is submitting the information during a login to an existing account or registration of a new account.

3. The computer-implemented method of claim 1, wherein the category associated with the information indicates a security value of the submitted information.

4. The computer-implemented method of claim 1, wherein determining the category associated with the information comprises identifying a category associated with a website to which the information was previously submitted and associating the submitted information with the determined category.

5. The computer-implemented method of claim 1, wherein a security risk is determined responsive at least in part to a determination that the category associated with the website indicates that the website contains information that should not be publicly exposed and a determination that the category associated with the information indicates that the information has been publicly exposed.

6. The computer-implemented method of claim 1, wherein performing the enforcement action comprises at least one of displaying a warning to the user indicating that the submission of information is a security risk or blocking the submission of the information.

7. A computer-implemented system for preventing a user from exposing private information on a website, comprising:
   a computer processor; and
   a computer-readable storage medium storing computer program code configured to execute on the computer processor, the computer program code when executed performing steps comprising:
     receiving information from a user for submission to a website;
     determining a category associated with the website to which the user is submitting the information, the category associated with the website indicating whether the website publicly exposes information submitted to the website or whether the website includes private information that should not be publically exposed;
     determining a category associated with the information indicating whether the information should not be publically exposed or whether the information has already been publically exposed;
     comparing the category associated with the website and the category associated with the information;
     determining that submitting the information to the website is a security risk based on the comparison indicating that the category associated with the website indicates that the website publicly exposes information submitted to the website and that the category associated with the information indicates that the information should not be publicly exposed;
     and
     performing an enforcement action responsive to determining that submitting the information to the website is a security risk.

8. The computer-implemented system of claim 7, wherein the category associated with the information indicates a security value of the submitted information.

9. The computer-implemented system of claim 7, wherein determining the category associated with the information comprises identifying a category associated with a website to which the information was previously submitted and associating the submitted information with the determined category.

10. The computer-implemented system of claim 7, wherein a security risk is determined responsive at least in part to a determination that the category associated with the website indicates that the website contains information that should not be publicly exposed and a determination that the category associated with the information indicates that the information has been publicly exposed.

11. A computer program product having a non-transitory computer-readable storage medium storing computer-executable code for preventing a user from exposing private information on a website, the code when executed performing steps comprising:
   receiving information from a user for submission to a website;
   determining a category associated with the website to which the user is submitting the information, the category associated with the website indicating whether the website publicly exposes information submitted to the website or whether the website includes private information that should not be publically exposed;
   determining a category associated with the information indicating whether the information should not be publically exposed or whether the information has already been publically exposed;
   comparing the category associated with the website and the category associated with the information;
   determining that submitting the information to the website is a security risk based on the comparison indicating that the category associated with the website indicates that the website publicly exposes information submitted to the website and that the category associated with the information indicates that the information should not be publicly exposed;
   and
   performing an enforcement action responsive to determining that submitting the information to the website is a security risk.

12. The computer program product of claim 11, wherein the category associated with the information indicates a security value of the submitted information.

13. The computer program product of claim 11, wherein determining the category associated with the information comprises identifying a category associated with a website to which the information was previously submitted and associating the submitted information with the determined category.

14. The computer program product of claim 11, wherein a security risk is determined responsive at least in part to a determination that the category associated with the website indicates that the website contains information that should not be publicly exposed and a determination that the category associated with the information indicates that the information has been publicly exposed.

* * * * *